J. LAUN.
BLADE OR PADDLE FOR MORTAR MIXERS.
APPLICATION FILED MAY 9, 1910.
967,646.
Patented Aug. 16, 1910.
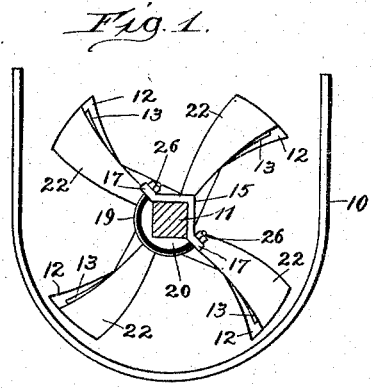
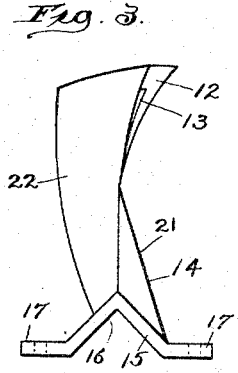
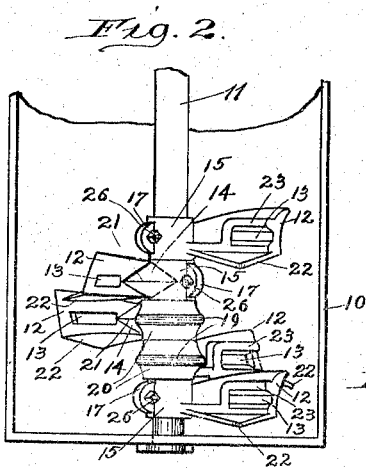
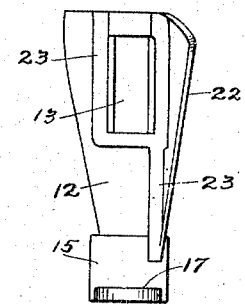
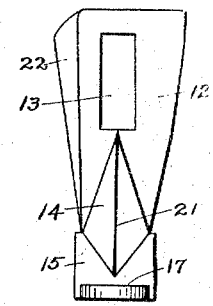
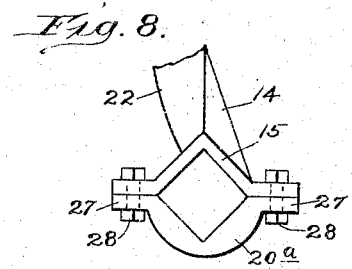
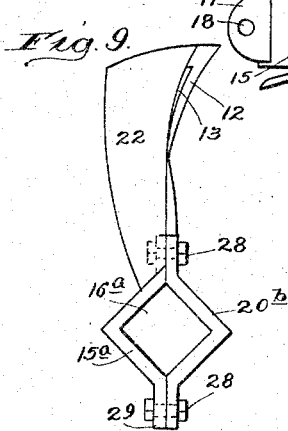
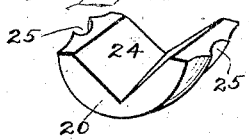
Witnesses:
Chas. E. Gorton
J. E. Hansen
Inventor:
Justus Laun.
By Chas. C. Tillman
Atty.

UNITED STATES PATENT OFFICE.

JUSTUS LAUN, OF CHICAGO, ILLINOIS.

BLADE OR PADDLE FOR MORTAR-MIXERS.

967,646.  Specification of Letters Patent.  Patented Aug. 16, 1910.

Application filed May 9, 1910. Serial No. 560,128.

*To all whom it may concern:*

Be it known that I, JUSTUS LAUN, a citizen of the United States, residing at Chicago, in the county of Cook and State of Illinois, have invented certain new and useful Improvements in Blades or Paddles for Mortar-Mixers, of which the following is a specification.

This invention relates to an improved blade or paddle to be used in mixing machines, such as are employed for mixing mortar and the like. and it consists in certain peculiarities of the construction, novel arrangement, and operation of the various parts thereof, as will be hereinafter more fully set forth and specifically claimed.

The principal object of the invention is to provide a blade or paddle of the above-named character, which shall be simple and inexpensive in construction, strong, durable and effective in operation, and so made that it can be placed on, or removed from, the rotary shaft of the machine, without having to remove the same from its bearings, and without interference by other blades or paddles on the said shaft.

Another object is to so construct the blade or paddle that when a number of them are properly mounted on the rotary shaft of the mixing machine, they will not only thoroughly mix and knead the material, but will also act upon it in the manner of a worm conveyer, and force it out of the mixing receptacle at one end thereof.

Other objects and advantages of the invention, will be disclosed in the subjoined description and explanation.

In order to enable others skilled in the art to which this invention pertains, to make and use the same, I will now proceed to describe it, referring to the accompanying drawings, in which—

Figure 1, is an end view partly in section of the mixing receptacle or trough of a mortar mixing machine, showing a rotary shaft mounted therein and equipped with paddles embodying the invention; Fig. 2, is a plan view thereof; Fig. 3, is a face view of the paddle; Fig. 4, is a view of one side thereof; Fig. 5, is a side view in elevation of the opposite side of the paddle; Fig. 6, is an end view in elevation when viewed from its free end; Fig. 7, is a detached perspective view of one form of the cap or fitting used in securing the paddle on the shaft; Fig. 8, is a view of a portion of the paddle showing a modification in the construction of the cap or fitting therefor, and also illustrating modified means for securing the same to the paddle; and Fig. 9, is a front face view of the paddle showing a modification in its construction, as well as modified means for securing it on the shaft.

Like numerals of reference, refer to corresponding parts throughout the different views of the drawing.

The reference numeral 10, designates the trough or mixing receptacle of a mixing machine for mortar and the like, in which is longitudinally journaled for rotation a shaft 11, which in the present instance is shown as being angular in cross section and on which, paddles embodying the invention are mounted in a manner to be presently explained.

Referring now to Figs. 1, to 7, inclusive, of the drawing, the blade or paddle therein shown consists of an elongated body 12, having a slot or elongated opening 13, extending from its free end to about its middle portion. From the inner end of the slot 13, on its front side, the body 12, is provided with an angular reinforcing enlargement 14, which extends to the head 15, of the paddle, which head is formed integrally therewith, and has a recess 16, in its outer surface to receive a portion of the shaft on which the paddle is mounted. This recess is shown as being angular but may be of any desired shape to suit the shaft. The head 15, is provided with laterally disposed extensions 17, each of which is formed with an opening 18, for the reception of the ends of a U-bolt 19, which, in connection with a cap 20, is used in securing the paddle on the shaft 11, as will be readily understood by reference to Fig. 1, of the drawing.

By reference to Figs. 2, 3, and 5, it will be seen and understood that the angular enlargement 14, on the body 12, presents its apex 21, in the direction of the travel of the paddle, and that said enlargement tapers toward the slot 13, in the body. On one side of the slot 13, the body 12, is provided with a flange 22, which is deflected from the body or in other words, is disposed at an angle thereto and constitutes the front face of the body, and as shown, is widened toward its free end. One side of the body 12, is provided around the opening 13, therein, with a thickened or reinforcing portion 23, part of which extends along the inner portion of the flange 22, and terminates at the head 15, as is clearly shown in Fig. 4, of the drawing. The cap or fitting 20, is provided on its inner surface with a recess 24, which, in the present instance, is shown as being angular, but which may be of any suitable shape to correspond with the shaft on which the paddle is mounted. The outer surface of the cap 20, is formed with a groove 25, to receive the U-bolt 19, the ends of which are inserted through the openings 18, of the extensions 17, and there secured by means of nuts 26, of the ordinary construction.

Instead of using the cap of the construction shown in Fig. 7, and above described, one, 20ª, of the construction shown in Fig. 8, may be used in which the groove on the outer surface of the fitting is omitted and said fitting or cap is provided with lateral extensions 27, through suitable openings in which, bolts 28, may be passed to secure it to the head 15, which is of the same construction as above set forth.

In Fig. 9, of the drawing, is shown another modification in the construction of the paddle, as well as in the manner of securing the cap thereto. In this modification, the body 12, of the paddle is provided with a head 15ª, which is longitudinally disposed with respect to the paddle, and has a recess 16ª, to receive a portion of the shaft. The outer end of the head 15ª, is provided with an apertured extension 29, and near the juncture of the head with the body, the latter is provided with an opening. Secured to the head 15ª, by means of bolts and nuts 28, is a cap 20ᵇ, of about the same construction shown in Fig. 8, and above described.

From the foregoing and by reference to the drawing, it will be readily understood and clearly seen, that paddles constructed according to my improvements, can be readily secured in place on the shaft 11, of the machine, in such a manner that they will offer no interference to each other, and as the caps which are used in connection with the paddles are detachable, the latter may be secured in place on the shaft without removing the same from its bearings. When in position for operation, as shown in Figs. 1, and 2, of the drawings, it is evident that, as the shaft rotates, the paddles will turn therewith and that as they pass through the batch of material, the same will be thoroughly mixed by reason of the peculiar construction of the paddles and at the same time, will be advanced toward the outlet end of the mixing receptacle or trough. The flanges 22, of each paddle, in the rotation of the series of paddles, will act to force the material forwardly so that it will come in contact with the adjacent paddle in front thereof, and some of the material will pass through the opening or slot therein, while the position of other parts of the material will be changed by the action of the body and angular enlargement 14, thereon, to the end, that a most thorough commingling of the ingredients will be effected.

Having thus fully described my invention, what I claim as new and desire to secure by Letters-Patent is—

1. A blade consisting of a body having a longitudinally disposed flange on its front edge, said flange being deflected from the plane of the body and widened toward its free end, and means at its other end to secure the blade to a shaft.

2. A blade consisting of a body having a longitudinally disposed slot near one of its ends and at its other end a recessed head provided with apertures, a longitudinally disposed flange on the front edge of the body, said flange being deflected from the plane of the body and widened toward its free end, a cap to fit on the head and having a recess to register with that of the latter, and means to secure the cap and head together.

JUSTUS LAUN.

Witnesses:
J. E. HANSEN,
CHAS. C. TILLMAN.